United States Patent [19]

Chen

[11] Patent Number: 6,093,985

[45] Date of Patent: Jul. 25, 2000

[54] NON-BRUSH TYPE DIRECT CURRENT MOTOR FOR ELECTRIC BICYCLE

[76] Inventor: Tun-I Chen, No. 14-32, Tien-Shin-Tzyy St., San-Chung City, Taipei Hsien, Taiwan

[21] Appl. No.: 09/281,826

[22] Filed: Apr. 7, 1999

[51] Int. Cl.[7] .................................................. H02K 7/00
[52] U.S. Cl. ........................................ 310/67 A; 310/66
[58] Field of Search .................................. 310/67 A, 156, 310/66, 254, 89, 91, 68 R

[56] References Cited

U.S. PATENT DOCUMENTS

| | | | |
|---|---|---|---|
| 4,677,328 | 6/1987 | Kumakura | 310/67 R |
| 4,860,176 | 8/1989 | Bauwens et al. | 310/67 A |
| 5,450,915 | 9/1995 | Li | 310/67 R |
| 5,497,040 | 3/1996 | Sato | 310/67 R |
| 5,581,136 | 12/1996 | Li | 310/67 R |
| 5,671,821 | 9/1997 | McGreen | 310/90 |
| 5,804,904 | 9/1998 | Park et al. | 310/261 |
| 5,828,145 | 10/1998 | Nakamura | 310/67 A |

FOREIGN PATENT DOCUMENTS

| | | | |
|---|---|---|---|
| 61-269650 | 11/1986 | Japan | H02K 21/06 |
| 5-319334 | 12/1993 | Japan | B62J 6/12 |

*Primary Examiner*—Nestor Ramirez
*Assistant Examiner*—Burton S. Mullins
*Attorney, Agent, or Firm*—Dougherty & Troxell

[57] ABSTRACT

A non-brush type low cost direct current motor for all electric bicycle, the motor is comprised of a housing and a lateral lid which form the internal receiving space for itself. A mandrel extends into two central holes respectively of the housing and the lateral lid, both ends of the mandrel are exposed for mounting two front fork tips of the bicycle. A sheet silicon steel core having a coil to be electrically activated is slipped over the mandrel. An annular inner surface is provided on the housing and allows mounting of a metal collar which can be adhered on the inner surface. Multiple magnets are arranged one by one to form an annular magnet layer. The external periphery of the sheet silicon steel core forms a gap with the annular magnet layer. When the coil is electrically activated, it automatically drives the bicycle. Thereby, a direct current motor of light weight and with low fault, low rubbing damage and low noise, and without gears and brush for a rechargeable low cost electric bicycle is provided.

3 Claims, 6 Drawing Sheets

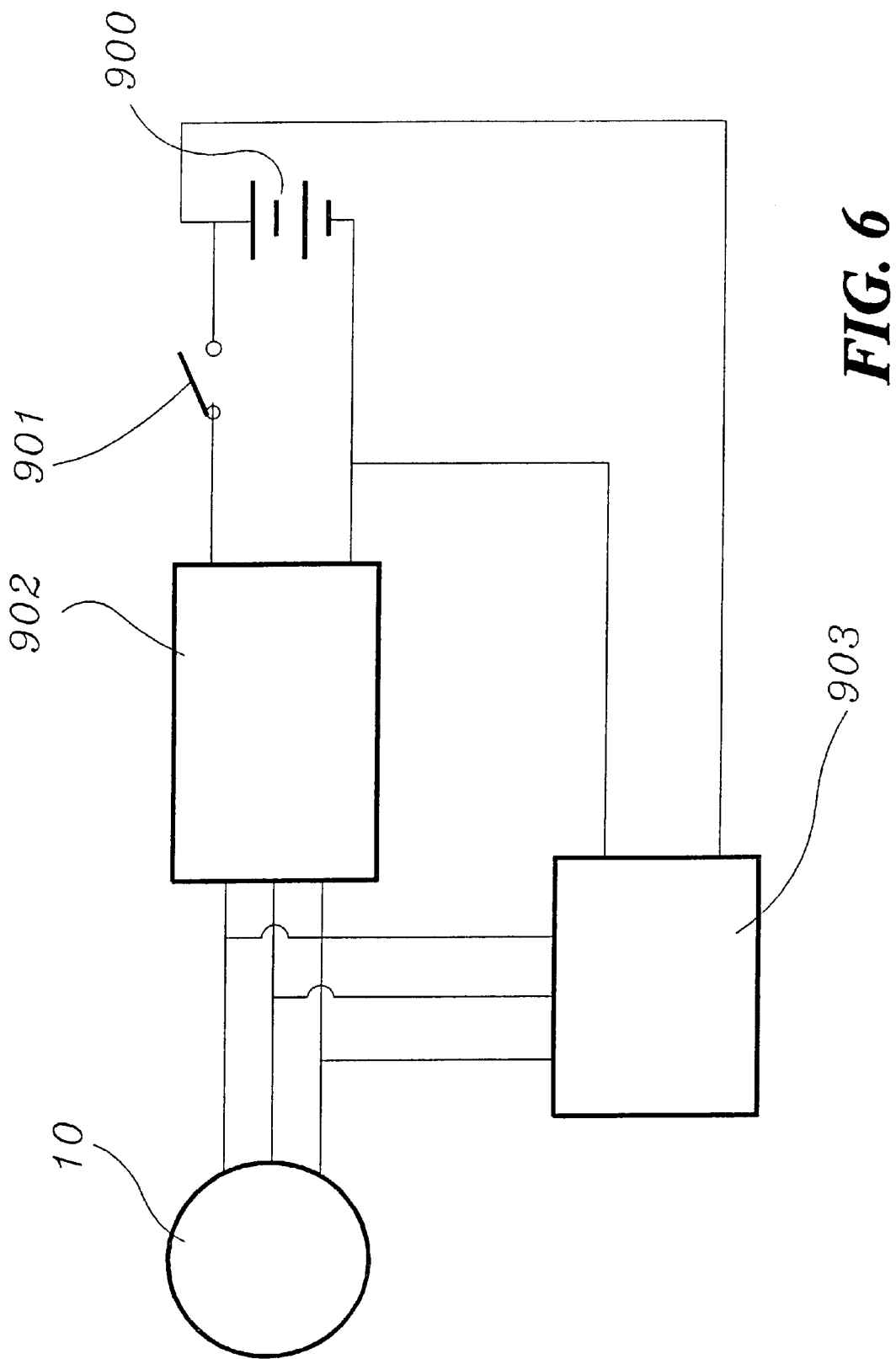

NON-BRUSH TYPE DIRECT CURRENT MOTOR FOR ELECTRIC BICYCLE

BACKGROUND OF THE INVENTION

1. Field of the Invention

The present invention is related to a non-brush type direct current motor for an electric bicycle, and especially to such an aiding motor for a rechargeable low cost electric bicycle without gears and brush.

2. Description of the Prior Art

Bicycles have been being used as tools to take the place of feet; motorcycles which save human force and run fast have substituted them. In the recent years, bicycles are once more popularized by virtue that they can be used for physical exercise and used as traffic tools without environmental pollution.

Bicycles are driven with man force no matter how good their gearing mechanisms are. However, a rider of a bicycle generally gets exhausted or can not afford the hardness in a long run or in an uphill riding. This is why people add electric motors without requirement of combustion fuel on their bicycles in order that riders can activate the motors to drive the bicycles when they are tired or ride on an uphill road.

Electric motors now used for bicycles mostly need complicated gearing mechanisms of which the way of transmitting with gears not only make the electric motors of the bicycles cumbersome, but also make the cost of manufacturing high and uneconomic. Electric motors are all required to be under speed limitation (they are generally limited not to exceed 25 km/hr). In which electric motors for those bicycles driven with gearing mechanisms add weight to the whole bicycles, add requirement for man force for driving the bicycles, and increase cost of manufacturing, and are subjected to fault to make mechanical rubbing, damage and noise.

And more, conventional motors aiding bicycles are mostly carbon brush types, they are subjected to rubbing and damage and need maintenance or changing or cleaning of the carbon brushes. In addition to this, noise is larger, but output thereof is lower, and life of use of batteries for them is shorter.

SUMMARY OF THE INVENTION

In view of this, the primary object of the present invention is to provide a non-brush type direct current motor for an electric bicycle. The body of the motor is comprised of a housing and a lateral lid, and a mandrel is extended centrally in the body with two ends thereof exposed. The mandrel is slipped over with a sheet silicon steel coil with a coil thereon. An annular inner surface is provided peripherally inside the housing for mounting a metal layer, the metal layer can be adhered with a plurality of magnets forming an annular magnet layer having their magnetic N, S poles alternately arranged. The annular magnet layer keeps a gap with the above mentioned coil; thereby, a non-brush and non-gear direct current motor for an electric bicycle able to automatically move forwardly is formed. The motor makes low noise, requires low cost and is structurally simplified, and thereby is not subjected to fault to make mechanical rubbing and damage. Moreover, mechanical energy from foot force for driving can be converted into electric energy to recharge the battery and thereby prolong life of the latter; in this way, the bicycle can run for a longer electric power drive.

The present invention will be apparent in novelty and other characteristics thereof after reading the detailed description of the preferred embodiment of the present invention in reference to the accompanying drawings.

BRIEF DESCRIPTION OF THE DRAWINGS

In the drawings:

FIG. 6 is an electric circuit diagram of a workable embodiment of the present invention.

DETAILED DESCRIPTION OF THE PREFERRED EMBODIMENT

Figure 1:
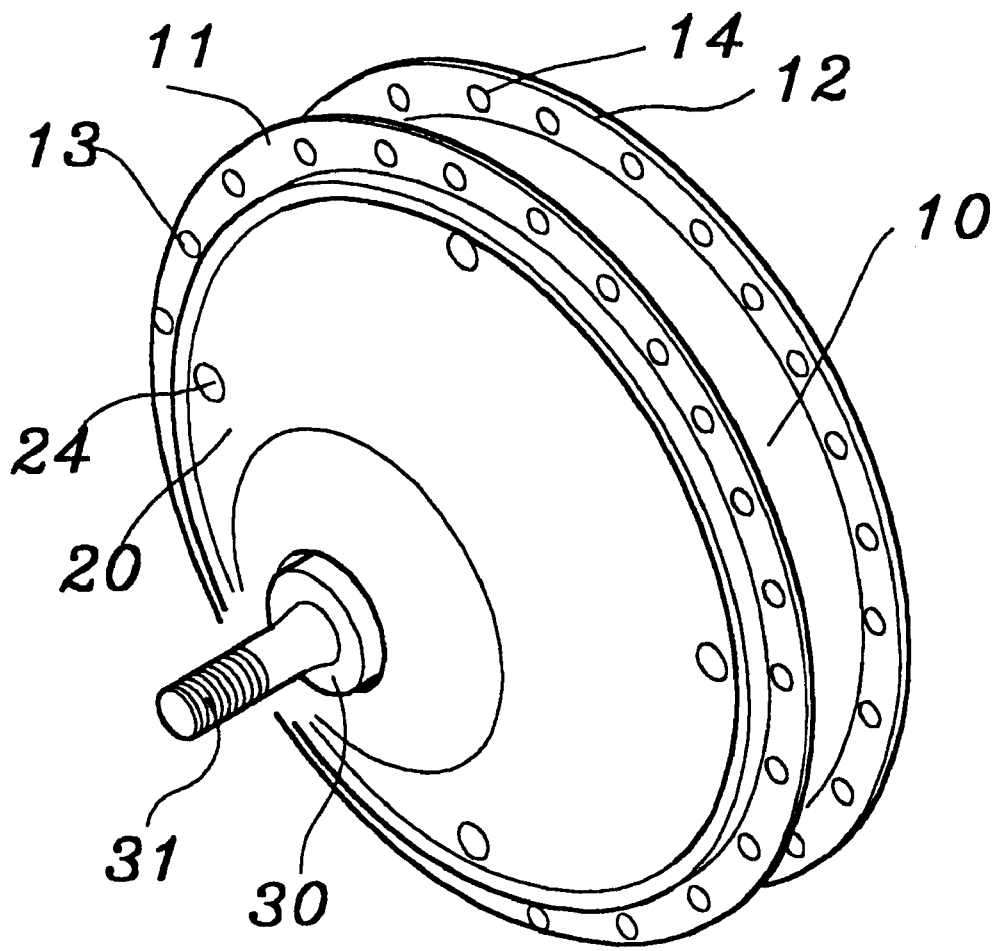
FIG. 1 is a perspective view showing an embodiment of the present invention.
Figure 2:
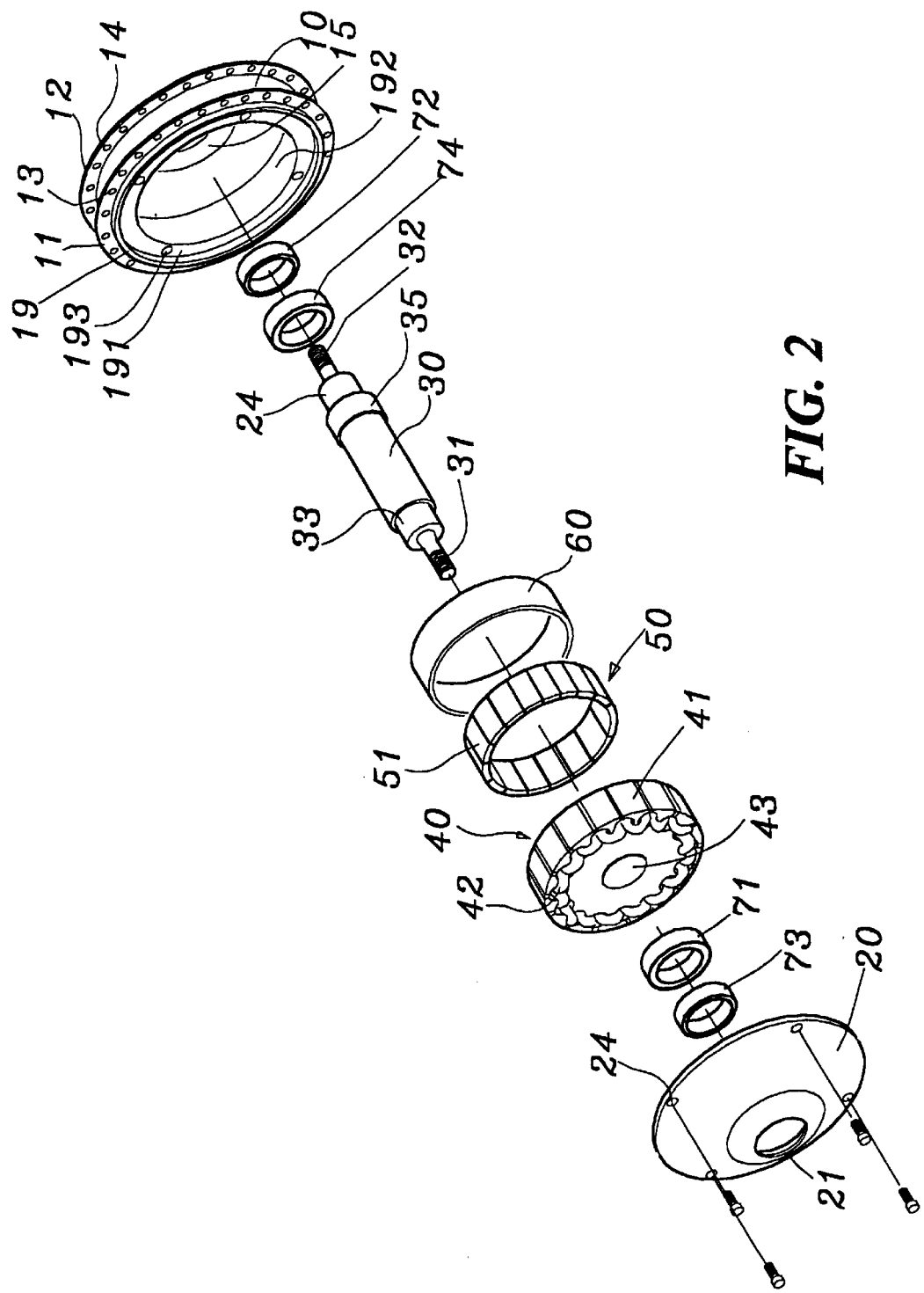
FIG. 2 is an analytic perspective view of the members shown in FIG. 1 of the present invention.

Referring firstly to FIGS. 1 and 2 of the drawings, the motor of the present invention is comprised mainly of a housing 10 and a lateral lid 20 which form the internal receiving space for the motor itself. And is comprised of a mandrel 30 extended centrally in the space, and sequentially outside of the mandrel 30, a sheet silicon steel core 40, an annular layer formed by a plurality of magnets 50 and a metal collar 60.

Figure 3:
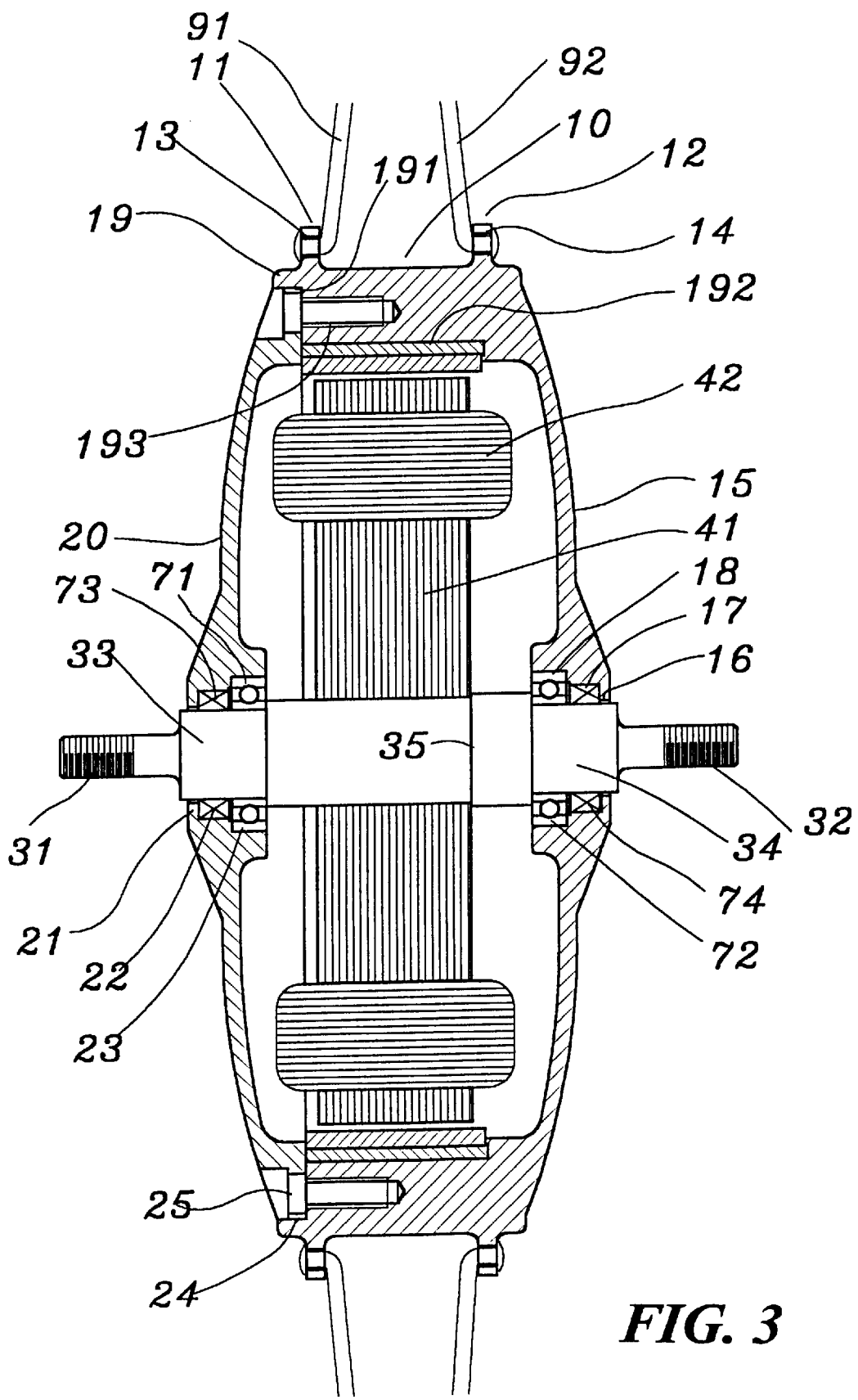
FIG. 3 is a longitudinal sectional view taken from FIG. 1 of the present invention.

As shown in FIGS. 2 and 3, the housing 10 is provided on the external periphery surface thereof with two parallel outstanding rings 11, 12 which are provided respectively with mutually opposite small holes 13, 14 for mounting steel spokes 91, 92 respectively of a bicycle wheel. One side of the whole housing 10 is opened, while a closed surface on the other side thereof is provided with a central hole 16, two enlarged holes 17, 18 forming steps with the central hole 16 are provided coaxially therewith. A laterally protruding ring 19 is provided on the opened side and forms a step-face 191 here; then an annular inner surface 192 extends inwardly therefrom to a suitable width for mounting thereon the metal collar 60. The step-face 191 is provided thereon a plurality of equidistantly spaced screw holes 193.

The diameter of the lateral lid 20 is slightly smaller than that of the laterally protruding ring 19 and can be fitly mounted therein against the step-face 191. A central hole 21 is provided on the lateral lid 20 corresponding to the central position of the housing 10. Two enlarged holes 22, 23 forming steps with the central hole 21 are provided coaxially therewith. The lateral lid 20 is provided thereon a plurality of equidistantly spaced screw holes 24 corresponding to the screw holes 193. These screw holes 24, 193 can be fixedly connected with a plurality of bolts 25.

The mandrel 30 has an appropriate length, both ends thereof extend respectively through the central holes 16, 21 of the housing 10 and the lateral lid 20. The mandrel 30 is provided on both ends thereof respectively with threaded sections 31 and 32 for mounting the front fork tips of the bicycle. Two insertion rod portions 33, 34 of a suitable length and a suitable diameter are respectively integrately provided internally of the threaded sections 31 and 32. The insertion rod portions 33, 34 are respectively fitted thereover with two bearings 71, 72 and oil seals 73, 74. An abutting shoulder 35 is provided on a suitable position of the mandrel 30.

Figure 4:
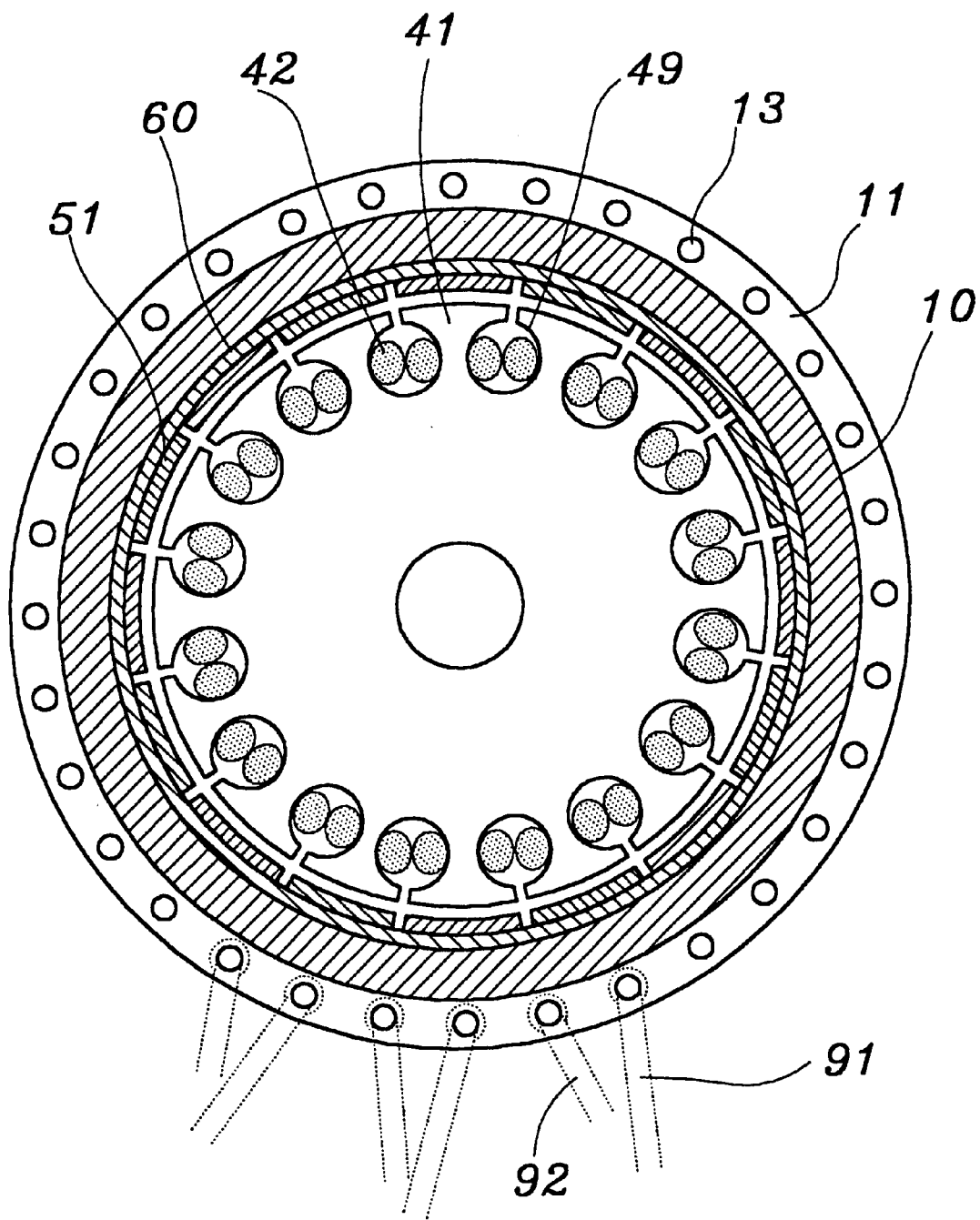
FIG. 4 is an transverse sectional view taken from FIG. 1 of the present invention.

Referring to FIGS. 2, 3 and 4 of the drawings, the annular inner surface 192 of the housing 10 can allow mounting therein the metal collar 60 which can be adhered thereto on the inner surface thereof a plurality of magnets 51 arranged one by one to form an annular magnet layer 50. A plurality of silicon steel sheets 41 are provided thereon with multiple small holes 49 for winding of a coil 42 (referring to FIG. 4). A central hole 43 of the silicon steel sheets 41 is slipped over the mandrel 30 and abuts against the abutting shoulder 35. The external peripheries of the silicon steel sheets 41 form a gap with the annular magnet layer 50.

Figure 5:
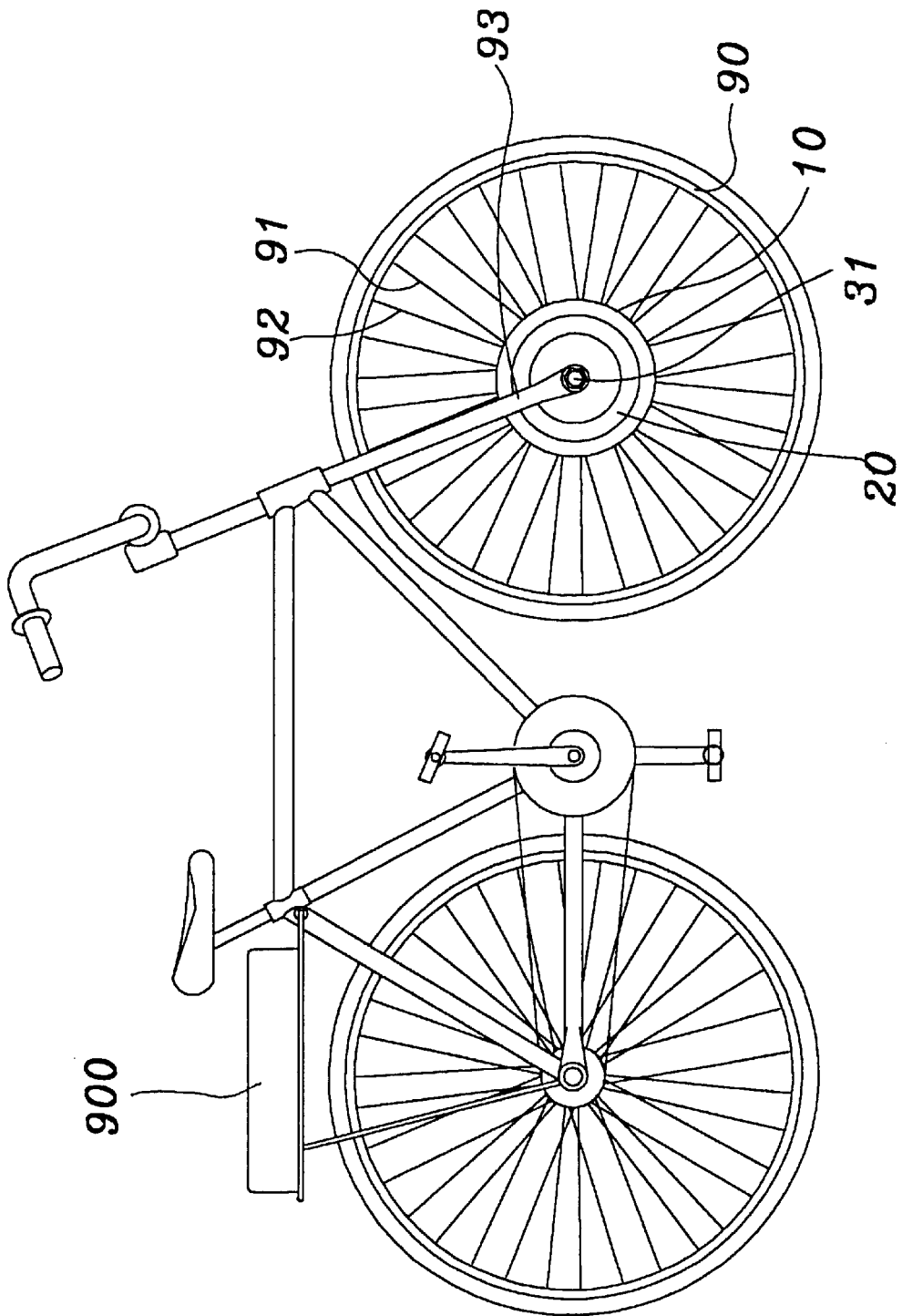
FIG. 5 is a schematic view showing the present invention is mounted on a bicycle.

As shown in FIG. 5, the whole aiding motor stated above can be mounted on a front wheel 90 of the bicycle, and a battery 900 can be provided on the tailing rack of the bicycle. The small holes 13, 14 on the two parallel outstanding rings 11, 12 of the housing 10 are able to mount the steel spokes 91, 92. The exposed threaded sections 31 and 32 on the two ends of the mandrel 30 can be used to mount the front fork tips 93 of the bicycle. The whole aiding motor is magnetically induced when the coil 40 is electrically activated, and the whole bicycle is driven to run forwardly.

As shown in FIG. 6, in the workable embodiment of the present invention, turning on/off of the battery 900 can be controlled with a switch 901, the battery 900 can further be connected to the main body 10 of the motor via a motor driving circuit 902. And a voltage adjuster 903 can be provided therebetween. When the battery 900 is turned on, the whole circuit 902 provides electric power for the bicycle. And when the battery 900 is turned off, the foot force is used to make the main body 10 of the motor a generator to recharge the battery 900 through the voltage adjuster 903, in this way, life of use of the battery 900 can be prolonged.

The whole aiding motor of the present invention does not need a complicated, cumbersome, and high cost gearing mechanism, it is a light and economic non-gear and non-brush type direct current motor, can be easily manufactured. In this way, the improved aiding motor is one which is structurally simplified, has low fault, low noise and low rubbing damage.

The present invention is therefore industrial valuable and is improved and novel, what I claim as new and desire to be secured by Letters Patent of the United States are:

1. A non-brush type direct current motor for a bicycle having a wheel mounting fork and comprising:

a) a housing having an inner annular surface, and an outer annular portion connected to a rim of a wheel of the bicycle so as to form a hub of the wheel and to rotate with the wheel;

b) a mandrel mounted on the housing such that the housing is rotatable with respect to the mandrel, the mandrel having opposite end portions extending from opposite sides of the housing and configured to be attached to the wheel mounting fork of the bicycle;

c) a rotor assembly fixedly attached to the inner annular surface the housing, the rotor assembly having a plurality of magnets in an annular array;

d) a stator assembly having a core formed of a plurality of silicon steel sheets, the core having a plurality of holes adjacent to a periphery thereof and an electrical coil winding passing through the plurality of holes, the core being attached to the mandrel and located in the housing such that the periphery is adjacent to the plurality of magnets;

e) a lateral lid attached to the housing so as to rotate therewith, one end portion of the mandrel extending through the lateral lid, the lateral lid and housing enclosing the stator and rotor assemblies;

f) a first bearing rotatably connecting the housing to the mandrel;

g) a second bearing rotatably connecting the lateral lid to the mandrel;

h) a source of electrical powers; and, i) a switch for connecting the source of electrical power to and disconnecting the source of electrical power from the electrical coil, whereby, when the source of electrical power is connected to the electrical coil, the housing is rotated with respect to the mandrel, thereby driving the bicycle wheel.

2. The non-brush direct current electric motor of claim 1, wherein the wheel has a plurality of spokes, each spoke having an inner end attached to the outer annular portion of the housing.

3. The non-brush direct current electric motor of claim 1, further comprising a motor driving circuit and a voltage adjuster electrically connected between the source of electrical power and the electrical coil.

* * * * *